US011292900B2

(12) United States Patent
Gahleitner et al.

(10) Patent No.: US 11,292,900 B2
(45) Date of Patent: Apr. 5, 2022

(54) POLYPROPYLENE COMPOSITION

(71) Applicant: BOREALIS AG, Vienna (AT)

(72) Inventors: Markus Gahleitner, Linz (DE); Jingbo Wang, Linz (DE); Klaus Bernreitner, Linz (DE); Pauli Leskinen, Porvoo (FI)

(73) Assignee: Borealis AG, Vienna (AT)

( * ) Notice: Subject to any disclaimer, the term of this patent is extended or adjusted under 35 U.S.C. 154(b) by 34 days.

(21) Appl. No.: 16/768,330

(22) PCT Filed: Dec. 18, 2018

(86) PCT No.: PCT/EP2018/085365
§ 371 (c)(1),
(2) Date: May 29, 2020

(87) PCT Pub. No.: WO2019/121597
PCT Pub. Date: Jun. 27, 2019

(65) Prior Publication Data
US 2021/0171750 A1   Jun. 10, 2021

(30) Foreign Application Priority Data

Dec. 20, 2017 (EP) .................... 17208801

(51) Int. Cl.
| | |
|---|---|
| *C08F 4/6592* | (2006.01) |
| *C08L 23/06* | (2006.01) |
| *C08L 23/12* | (2006.01) |
| *C08L 23/16* | (2006.01) |

(52) U.S. Cl.
CPC ............ *C08L 23/12* (2013.01); *C08F 4/6592* (2013.01); *C08L 23/06* (2013.01); *C08L 23/16* (2013.01); *C08L 2207/066* (2013.01)

(58) Field of Classification Search
CPC .......... C08L 23/10; C08L 23/12; C08L 23/14; C08L 23/16; C08L 2207/02; C08L 2207/06; C08L 2205/03; C08L 23/08; C08L 23/0815; C08L 23/0807
See application file for complete search history.

(56) References Cited

U.S. PATENT DOCUMENTS

| | | | |
|---|---|---|---|
| 9,243,137 B2 | 1/2016 | Reichelt et al. | |
| 9,637,602 B2 | 5/2017 | Potter et al. | |
| 9,670,293 B2 | 6/2017 | Reznichenko et al. | |
| 9,670,347 B2 | 6/2017 | Tölsch et al. | |
| 9,708,481 B2 | 7/2017 | Wang et al. | |
| 9,745,431 B2 | 8/2017 | Potter et al. | |
| 9,751,962 B2 | 9/2017 | Wang et al. | |
| 9,777,142 B2 | 10/2017 | Sandholzer et al. | |
| 9,802,394 B2 | 10/2017 | Cavacas et al. | |
| 9,828,698 B2 | 11/2017 | Wang et al. | |
| 9,890,275 B2 | 2/2018 | Sandholzer et al. | |
| 9,976,020 B2 | 5/2018 | Nummila-Pakarinen et al. | |
| 10,000,674 B1 | 6/2018 | Wang et al. | |
| 10,011,708 B2 | 7/2018 | Lampela et al. | |
| 10,030,109 B2 | 7/2018 | Boragno et al. | |
| 10,040,930 B2 | 8/2018 | Gloger et al. | |
| 10,100,185 B2 | 10/2018 | Wang et al. | |
| 10,100,186 B2 | 10/2018 | Wang et al. | |
| 10,227,427 B2 | 3/2019 | Reichelt et al. | |
| 10,450,451 B2 | 10/2019 | Wang et al. | |
| 10,519,259 B2 | 12/2019 | Resconi et al. | |
| 2014/0005324 A1 | 1/2014 | Reichelt et al. | |
| 2016/0185946 A1 | 6/2016 | Sandholzer et al. | |
| 2016/0194486 A1 | 7/2016 | Sandholzer et al. | |
| 2016/0200838 A1 | 7/2016 | Reznichenko et al. | |
| 2016/0208085 A1 | 7/2016 | Gloger et al. | |
| 2016/0229158 A1 | 8/2016 | Cavacas et al. | |
| 2016/0237270 A1 | 8/2016 | Wang et al. | |
| 2016/0244539 A1 | 8/2016 | Resconi et al. | |
| 2016/0272740 A1 | 9/2016 | Wang et al. | |
| 2016/0280899 A1 | 9/2016 | Töltsch et al. | |
| 2016/0304681 A1 | 10/2016 | Potter et al. | |
| 2016/0311951 A1 | 10/2016 | Reichelt et al. | |
| 2016/0311988 A1 | 10/2016 | Potter et al. | |
| 2016/0312018 A1 | 10/2016 | Vestberg et al. | |
| 2016/0312019 A1 | 10/2016 | Lampela et al. | |

(Continued)

FOREIGN PATENT DOCUMENTS

| | | |
|---|---|---|
| EA | 18358 B1 | 7/2013 |
| EP | 0 887 379 A1 | 12/1998 |

(Continued)

OTHER PUBLICATIONS

Busico et al., "Alk-1-ene Polymerization in the Presence of a Monocyclopentadienyl Zirconium (IV) Acetamidinate Catalyst: Microstructural and Mechanistic Insights$^a$," *Macromol. Rapid Commun.* 28:1128-1134 (2007).
Busico et al., "Full Assignment of the $^{13}$C NMR Spectra of Regioregular Polypropylenes: Methyl and Methylene Region," *Macromolecules* 30:6251-6263 (1997).
Busico et al., "Microstructure of polypropylene," *Prog. Polym. Sci.* 26:443-533 (2001).
Castignolles et al., "Detection and quantification of branching in polyacrylates by size-exclusion chromatography (SEC) and melt-state $^{13}$C NMR spectroscopy," *Polymer*, 50(11):2373-2383, (2009).
Filip et al., "Heteronuclear decoupling under fast MAS by a rotor-synchronized Hahn-echo pulse train,"*J. Magnet. Reson.* 176:239-243 (2005).

(Continued)

*Primary Examiner* — Irina S Zemel
*Assistant Examiner* — Jeffrey S Lenihan
(74) *Attorney, Agent, or Firm* — Leydig, Voit & Mayer, Ltd.

(57) ABSTRACT

Polypropylene composition comprising a heterophasic polypropylene (HECO) and a bimodal metallocene linear low-density polyethylene (mLLDPE), as well as articles obtained from said polypropylene composition. The present invention is further related to the use of a bimodal metallocene linear low-density polyethylene (mLLDPE) as modifier for heterophasic polypropylenes (HECOs) to improve impact strength and optics.

13 Claims, 1 Drawing Sheet

(56) References Cited

U.S. PATENT DOCUMENTS

| | | |
|---|---|---|
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0308385 A1 | 10/2020 | Gahleitner et al. |

FOREIGN PATENT DOCUMENTS

| | | |
|---|---|---|
| EP | 0 887 380 A1 | 12/1998 |
| EP | 0 887 381 A1 | 12/1998 |
| EP | 0 991 684 B1 | 1/2006 |
| EP | 1 358 266 B1 | 11/2007 |
| EP | 2 431 416 A1 | 3/2012 |
| EP | 2 691 456 B1 | 6/2015 |
| EP | 3 257 879 A1 | 12/2017 |
| EP | 3 257 895 A1 | 12/2017 |
| RU | 2510407 C2 | 3/2014 |
| WO | WO 92/12182 A1 | 7/1992 |
| WO | WO 99/24478 A1 | 5/1999 |
| WO | WO 99/24479 A1 | 5/1999 |
| WO | WO 00/68315 A1 | 11/2000 |
| WO | WO 02/44272 A1 | 6/2002 |
| WO | WO 2004/000899 A1 | 12/2003 |
| WO | WO 2004/111095 A1 | 12/2004 |
| WO | WO 2008/074423 A1 | 6/2008 |
| WO | WO 2010/149529 A1 | 12/2010 |
| WO | WO 2013/007650 A1 | 1/2013 |
| WO | WO 2013/026745 A1 | 2/2013 |
| WO | WO2015177094 A1 * | 11/2015 |
| WO | WO 2016/083208 A1 | 6/2016 |
| WO | WO2016083208 A1 * | 6/2016 |

OTHER PUBLICATIONS

Griffin et al., "Low-load rotor-synchronised Hahn-echo pulse train (RS-HEPT) $^1$H decoupling in solid-state NMR: factors affecting MAS spin-echo dephasing times," *Magn. Reson. Chem.* 45:S198-S208 (2007).

Klimke et al., "Optimisation and Application of Polyolefin Branch Quantification by Melt-State $^{13}$C NMR Spectroscopy," *Macromol. Chem. Phys.* 207(4):382-395 (2006).

Parkinson et al., "Effect of Branch Length on $^{13}$C NMR Relaxation Properties in Molten Poly[ethylene-co-($\alpha$-olefin)] Model Systems," *Macromol. Chem. Phys.* 208(19-20):2128-2133 (2007).

Pollard et al., "Observation of Chain Branching in Polyethylene in the Solid State and Melt via 13C NMR Spectroscopy and Melt NMR Relaxation Time Measurements," *Macromolecules*, 37(3):813-825 (2004).

Resconi et al., "Selectivity in Propene Polymerization with Metallocene Catalysts," *Chem. Rev.* 100(4):1253-1345 (2000).

Zhou et al., "A new decoupling method for accurate quantification of polyethylene copolymer composition and triad sequence distribution with $^{13}$C NMR," *J. Magnet. Reson.* 187:225-233 (2007).

European Patent Office, International Search Report in International Application No. PCT/EP2018/085365 (dated Jan. 31, 2019).

European Patent Office, Written Opinion in International Application No. PCT/EP2018/085365 (dated Jan. 31, 2019).

International Bureau of WIPO, International Preliminary Report on Patentability in International Application No. PCT/EP2018/085365 (dated Jun. 23, 2020).

European Patent Office, Extended European Search Report in European Patent Application No. 17208801.5 (dated Jun. 20, 2018).

Federal Institute of Industrial Property (FIPS), Request of the substantive examination in Russian Patent Application No. 2020121822/04(037429) (Nov. 10, 2020).

* cited by examiner

POLYPROPYLENE COMPOSITION

CROSS-REFERENCE TO RELATED APPLICATIONS

This patent application is the U.S. national phase of International Application No. PCT/EP2018/085365, filed on Dec. 18, 2018, which claims the benefit of European Patent Application No. 17208801.5, filed Dec. 20, 2017, the disclosures of which are incorporated herein by reference in their entireties for all purposes.

The present invention is directed to a polypropylene composition comprising a heterophasic polypropylene (HECO) and a bimodal metallocene linear low-density polyethylene (mLLDPE) as well as articles obtained from said polypropylene composition. The present invention is further related to the use of a bimodal metallocene linear low-density polyethylene (mLLDPE) as modifier for heterophasic polypropylenes (HECOs) to improve impact strength and optics.

Heterophasic polypropylenes (HECOs) are well known in the art and appreciated for their good impact behaviour. Such heterophasic propylene copolymers comprise a matrix being either a propylene homopolymer and/or a random propylene copolymer in which an elastomeric copolymer is dispersed. Thus, the polypropylene matrix contains (finely) dispersed inclusions being not part of the matrix and said inclusions contain the elastomeric copolymer. The term inclusion indicates that the matrix and the inclusion form different phases within the heterophasic propylene copolymer, said inclusions are for instance visible by high-resolution microscopy, like electron microscopy or scanning force microscopy.

Heterophasic polypropylenes are suitable for many applications, like packaging films, thin wall packaging, injection stretch blow moulding (ISBM) applications etc.

For such applications, it is a continuous request by the industry to have products at hand that show better stiffness, better optical behaviour and better impact behaviour at the same time: Polymers with higher stiffness can be converted into articles with lower wall thickness, allowing material and energy savings.

Polymers with good optical properties, especially low haze, are desired for consumer related articles to provide good "see-through" properties on the content of the packed goods.

Polymers with good impact behaviour are also desired in consumer related articles to safely keep the content even when dropped.

The demands can be challenging, since many polymer properties are directly or indirectly interrelated, i.e. improving a specific property can only be accomplished at the expense of another property.

Stiffness can, for instance be improved by increasing the crystallinity and/or the relative amount of homopolymer within the composition. As a consequence, the material becomes more brittle, thereby resulting in poor impact properties and/or worse optical properties.

Impact behaviour or optical properties can be improved by increasing the comonomer content. As a consequence the material will become softer and loose on stiffness.

The optical properties can also be improved by using a rubber phase having a very low intrinsic viscosity, but this in turn leads to problems in production since the resulting polymer powder is very sticky.

Thus, impact or optical properties such as haze behave in a conflicting manner to stiffness.

It is therefore an object of the present invention to provide a polypropylene composition comprising a heterophasic system with an optimized or improved balance between mechanical properties, like stiffness and impact strength, and optical properties, especially haze.

Viewed from another aspect, it is a constant need to provide polymers, which not only show improvements in one or two of these mechanical or optical properties. So it is desired to provide products with a well-balanced and continuously improved overall performance. Such an improvement in the overall performance can be expressed by the optomechanical ability:

Optomechanical ability (OMA) is herein understood as the ratio of mechanical (especially impact and flexural) behaviour to optical performance, namely haze, wherein the mechanical properties are targeted to be as high as possible and the optical performance such as haze is desired to be as low as possible.

The optomechanical ability can be determined by multiplying Flexural Modulus and notched impact strength (NIS) and putting this product in relation to haze determined on 1 mm plaques:

$$OMA = \frac{\text{Flex Modulus [MPa]} * NIS\left[\frac{kJ}{m^2}\right]}{\text{Haze (1 mm) [\%]}}$$

Several attempts to solve the above mentioned problems have been proposed.

EP 1358266 B1 describes polyolefin compositions with good transparency comprising
(a) 85-98 wt % based on the total weight of the composition of a heterophasic propylene/α-olefin copolymer comprising a polymer or copolymer of propylene and an α-olefin with 0-15 mol % of the α-olefin as matrix polymer and a propylene/α-olefin rubber copolymer comprising 20-80 mol % of the α-olefin and
(b) 15-2 wt % based on the total weight of the composition of an ethylene homopolymer, the ethylene homopolymer having a density lower than 0.920 g/cm³.

Such compositions show quite low impact strength at 23° C. of around 11 kJ/m².

EP 2691456 B1 discloses a polypropylene composition comprising
(a) heterophasic propylene copolymer (RAHECO) comprising (a1) a matrix being a random propylene copolymer (R-PP), (a2) an elastomeric propylene copolymer (E) being dispersed in said matrix, and
(b) a polyethylene (PE),
wherein further
  (i) said polypropylene composition and/or said heterophasic propylene copolymer (RAHECO) is/are α-nucleated, and
  (ii) said heterophasic propylene copolymer (RAHECO) has a melt flow rate measured according to ISO 1133 in the range of equal or more than 0.5 to equal or below 6.0 g/10 min, and (iii) said heterophasic propylene copolymer (RAHECO) has a xylene cold soluble (XCS) fraction determined at 25° C. according ISO 16152 of 20 to 35 wt %.

The polyethylene used in the examples is a low-density polyethylene (LDPE). Such compositions also show quite low impact strength at 23° C. in combination with limited stiffness.

Blends of polypropylene with linear low-density polyethylenes are also known in the art. It is however known, that especially at higher amounts of LLDPE it is difficult to obtain the two-phase structure in stable form.

In addition, as is shown in the comparative Example, blends with linear low-density polyethylenes produced with a Ziegler-Natta catalyst, do not provide the desired improvement in the overall performance of the blends.

The drawback of such compositions is i.a. a broader MWD and comonomer distribution, which is not beneficial for the targeted applications.

Thus, although a lot of work has be done in this field, there is still the need to provide polypropylene compositions with an optimized or improved balance between mechanical properties, like stiffness and impact strength, and optical properties, especially haze.

The finding of the present invention is to provide a polypropylene composition comprising a heterophasic polypropylene (HECO) and a bimodal metallocene linear low-density polyethylene (mLLDPE).

Accordingly, the present invention is directed to a polypropylene composition, comprising
(A) a heterophasic polypropylene (HECO), said heterophasic polypropylene comprising a matrix (M) being a propylene homopolymer and an elastomeric propylene-ethylene copolymer dispersed in said matrix (M), and
(B) a bimodal metallocene linear low-density polyethylene (mLLDPE), said bimodal metallocene linear low-density polyethylene (mLLDPE)
   (a) being a terpolymer of ethylene and two different comonomers selected from alpha olefins having from 4 to 10 carbon atoms and
   (b) being produced with a metallocene catalyst and
   (c) having a density of 915 to 930 kg/m3 (according to ISO 1183)
(C) optionally a polypropylene homopolymer with a melt flow rate MFR2 (ISO 1133; 230° C.; 2.16 kg) in the range of 0.5 to 100.0 g/10 min and/or
(D) optionally an alpha nucleating agent In an embodiment the blend comprises
Component (A) in an amount of from 95.0 to 55.0 wt %
Component (B) in an amount of from 5.0 to 45.0 wt %
Component (C) in an amount of from 0.0 to 6.0 wt % and
Component (D) in an amount from 0.0 to 1.0 wt %, based on the total weight of the composition.

In a further embodiment of the present invention, the polypropylene composition has
   i) a haze according to ASTM D 1300-00 determined on 1 mm plaques below 35.0% and
   ii) a Charpy notched Impact strength (NIS, ISO 179 1eA determined at 23° C.) of at least 15.0 kJ/m$^2$ In another embodiment of the present invention, the polypropylene composition has an optomechanical ability (OMA) according to formula $$OMA = \frac{\text{Flex Modulus [MPa]} * NIS\left[\frac{kJ}{m^2}\right]}{\text{Haze (1 mm) [\%]}}$$

of at least 500 or more.

In still another embodiment, the invention relates to articles comprising the polypropylene composition.

In yet another embodiment, the invention relates to the use of a bimodal metallocene linear low-density polyethylene (mLLDPE) as modifier for heterophasic polypropylenes (HECOs) to improve impact strength and optics.

DETAILED DESCRIPTION

Figures 1A, 1B:
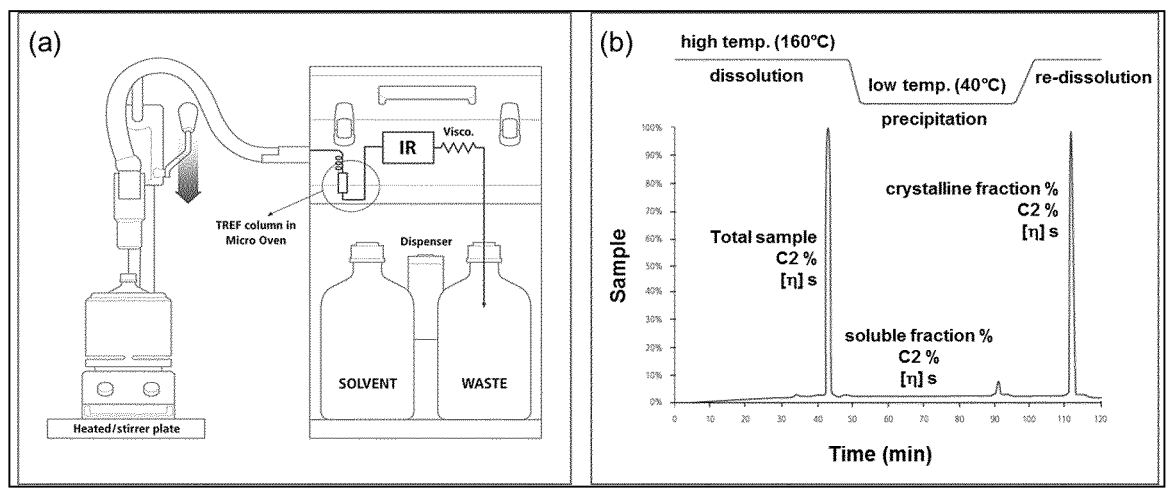
FIG. 1a shows a schematic diagram of a CRYSTEX QC instrument.
FIG. 1b shows a separation of the crystalline and amorphous fractions of the polypropylene composition through temperature cycles of dissolution.

In the following the individual components are defined in more detail.

The polypropylene composition of the present inventions comprises at least a blend of
(A) a heterophasic polypropylene (HECO) and
(B) a bimodal metallocene linear low-density polyethylene (mLLDPE)

Component (A) Heterophasic Polypropylene (HECO)

The particular heterophasic polypropylene (HECO) of the present invention comprises at least
(A-1) the matrix (M) being a polypropylene homopolymer (H-PP) and
(A-2) the elastomeric propylene-ethylene copolymer dispersed in said matrix (M), as defined in more detail below.

Optionally heterophasic polypropylene (HECO) further comprises component (A-3) being a crystalline ethylene copolymer.

The term "heterophasic polypropylene" used herein denotes compositions consisting of a polypropylene homopolymer matrix resin and an elastomeric propylene-ethylene copolymer dispersed in said matrix resin and optionally a crystalline ethylene copolymer.

In the present invention, the term "matrix" is to be interpreted in its commonly accepted meaning, i.e. it refers to a continuous phase (in the present invention a continuous polymer phase) in which isolated or discrete particles such as rubber particles may be dispersed. The propylene homopolymer is present in such an amount that it forms a continuous phase, which can act as a matrix.

Ad Component (A-1):

Component (A-1) of the particular heterophasic polypropylene is a propylene homopolymer forming the matrix of the heterophasic polypropylene copolymer.

The expression homopolymer used in the instant invention relates to a polypropylene that consists substantially, i.e. of at least 97.0 wt %, preferably of at least 98.0 wt %, more preferably of at least 99.0 wt %, still more preferably of at least 99.8 wt % of propylene units. In a preferred embodiment, only propylene units in the propylene homopolymer are detectable.

The propylene homopolymer matrix has a melt flow rate MFR$_2$ (ISO 1133; 230° C.; 2.16 kg) in the range of 0.1 to 400.0 g/10 min, preferably in the range of 0.3 to 300.0 min, more preferably in the range of 0.5 to 200.0 g/10 min, even more preferably in the range of 1.0 to 150.0 g/10 min.

The MFR$_2$ of the matrix is named matrix melt flow rate (MFR$_M$).

The propylene homopolymer has a melting temperature Tm1 determined by DSC analysis according to ISO 11357.

Preferably, Tm1 of the propylene homopolymer is within the range of 145° C. to 170° C., more preferably within the range of 147° C. to 169° C. and most preferably within the range of 149° C. to 167° C.

The polypropylene homopolymer may comprise or consist of a single polypropylene homopolymer fraction (=unimodal), but may also comprise a mixture of different polypropylene homopolymer fractions.

In cases where the polypropylene homopolymer comprises different fractions, the polypropylene homopolymer is understood to be bi- or multimodal.

These fractions may have different average molecular weight or different molecular weight distribution.

It is preferred that the polypropylene homopolymer can be bimodal or multimodal in view of molecular weight or molecular weight distribution.

It is alternatively preferred that the polypropylene homopolymer can be unimodal in view of average molecular weight and/or molecular weight distribution.

Thus in one embodiment or the present invention the matrix (M) is unimodal, whereas in another embodiment the matrix (M) is bimodal and consists of two propylene homopolymer fractions (H-PP-1) and (H-PP-2).

Ad Component (A-2):

Component (A-2) is an elastomeric propylene-ethylene copolymer, which is a copolymer of propylene and ethylene being dispersed in said matrix (M) (i.e. dispersed phase).

Component (A-2) of the particular heterophasic polypropylene is the so called ethylene-propylene rubber phase.

The term "ethylene-propylene rubber phase" denotes the material, which is essentially dispersed in the matrix and is soluble in p-xylene under the conditions described as XCS.

The terms "elastomeric propylene-ethylene copolymer", "xylene cold soluble (XCS) fraction of the heterophasic polypropylene", "dispersed phase" and "ethylene-propylene rubber" are to be interpreted in its commonly accepted meaning, i.e. they denote the same, i.e. are interchangeable.

The elastomeric propylene-ethylene copolymer can either be synthesised in the later step(s) of a multistage process, after the polypropylene homopolymer (A-1) has been synthesized. Alternatively, elastomeric propylene-ethylene copolymer can be polymerized separately and mixed with the polypropylene homopolymer (A-1) in a separate melt blending step.

It is preferred, that the incorporation of the elastomeric propylene-ethylene copolymer (A-2) into the polypropylene homopolymer (A-1) is done during a multistage polymerization process.

Like the propylene homopolymer matrix, the dispersed phase can be unimodal or multimodal, like bimodal.

In one embodiment, the dispersed phase is unimodal. More particularly, the dispersed phase is preferably unimodal in view of the intrinsic viscosity and/or the comonomer distribution. Concerning the definition of unimodal and multimodal, like bimodal, it is referred to the definition above.

Preferably, the unimodal dispersed phase is made in one reaction stage, more preferably in a gas phase reactor ad comprises, respectively consists of one propylene-ethylene copolymer fraction.

Ad Component (A-3)

As component (A-3) a crystalline ethylene copolymer with an α-olefin with 3-10 carbon atoms is optionally present.

α-olefins with 3-10 carbon atoms are for example propylene, 1-butene, 1-pentene, 1-hexene, 1-heptene and 1-octene.

The crystalline ethylene copolymer is a by-reaction product obtained by the preparation of the heterophasic polypropylene composition. Such crystalline ethylene copolymer is present as inclusion in the amorphous phase due to thermodynamic reasons.

The crystalline ethylene copolymer has a melting temperature Tm2 and a melting enthalpy Hm2 as determined by DSC analysis according to ISO 11357.

Preferably, Tm2 of the crystalline ethylene copolymer is within the range of 105° C. to 130° C., more preferably within the range of 110° C. to 127° C. and most preferably within the range of 112° C. to 124° C.

Preferably, Hm2 of the crystalline ethylene copolymer is less than 2.0 J/g, more preferably less than 1.0 J/g and most preferably less than 0.5 J/g.

For such heterophasic polypropylenes the matrix phase and the elastomeric phase usually cannot be exactly divided from each other. In order to characterize the crystalline phase and the elastomeric phase of a heterophasic polypropylene composition several methods are known.

One method is the extraction of a phase, which contains to the most part the elastomeric phase, with xylene, thus separating a xylene cold soluble (XCS) fraction from a xylene insoluble (XCI) fraction. The XCS fraction contains for the most part the elastomeric phase and only a small part of the matrix phase, whereas the XCI fraction contains for the most part the matrix phase and only a small part of the elastomeric phase. The xylene extraction is especially suitable for heterophasic polypropylenes with a highly crystalline matrix phase such as propylene homopolymer matrix phase or propylene random copolymer matrix phase with a low comonomer content of not more than about 3 wt %. For heterophasic polypropylene with a propylene random copolymer matrix phase with comonomer contents of more than about 3 wt %, the amount of matrix phase in the XCS fraction is so high (about 5 wt % or higher), so that the XCS fraction cannot be suitably used for characterizing the elastomeric phase of the heterophasic polypropylene as the high amount of matrix phase in the XCS fraction cannot be neglected.

Another method is the separation of a crystalline fraction and a soluble fraction with the CRYSTEX method with trichlorobenzene. This method is described below in the measurement methods section. In this method a crystalline fraction (CF) and a soluble fraction (SF) are separated from each other. The crystalline fraction contains for the most part the matrix phase and only a small part of the elastomeric phase and the soluble fraction contains for the most part the elastomeric phase and only a small part of the matrix phase.

Due to the differences in the separation methods of xylene extraction and CRYSTEX method the properties of XCS/XCI fractions on the one hand and crystalline/soluble fraction on the other hand are not exactly the same, meaning that the amounts of matrix phase and elastomeric phase can differ as well as the properties.

The heterophasic polypropylene preferably has an amount of XCS fraction of from 5.0 wt % to 25.0 wt %, more preferably from 7.0 wt % to 23.0 wt % and most preferably from 10.0 wt % to 20.0 wt %, based on the total amount of the polymer base resin.

Preferably, the XCS fraction has an ethylene content of from 8.0 wt % to 70.0 wt % more preferably from 9.0 wt % to 50.0 wt % and most preferably from 10.0 wt % to 35.0 wt % based on the total amount of monomer units in the XCS fraction.

Thereby, the remaining amount of monomer units of the XCS fraction making up to 100 wt % is the amount of propylene monomer units.

Further, the XCS fraction preferably has an intrinsic viscosity iV of from 1.0 dl/g to 5.0 dl/g, more preferably from 1.2 dl/g to 3.0 dl/g, and most preferably from 1.3 dl/g to 2.5 dl/g.

The XCI fraction is thus preferably present in the heterophasic polypropylene in an amount of from 75.0 wt % to 95.0 wt %, more preferably from 77.0 wt % to 93.0 wt % and most preferably from 80.0 wt % to 90.0 wt %, based on the total amount of heterophasic polypropylene.

Crystalline Fraction (CF) of the CRYSTEX Measurement:

The crystalline fraction of the CRYSTEX measurement is preferably present in the heterophasic polypropylene in an amount of from 75.0 wt % to 95.0 wt %, more preferably from 77.0 wt % to 93.0 wt % and most preferably from 80.0 wt % to 90.0 wt %, based on the total amount of polymer base resin.

Preferably, the crystalline fraction has an ethylene content of from 0.0 wt % to 5.0 wt %, more preferably from 0.1 wt % to 4.0 wt % and most preferably from 0.2 wt % to 3.0 wt %, based on the total amount of monomer units in the crystalline fraction.

Thereby, the remaining amount of monomer units of the crystalline fraction making up to 100 wt % is the amount of propylene monomer units.

Further, the crystalline fraction preferably has an intrinsic viscosity iV of from 1.0 dl/g to 5.0 dl/g, more preferably from 1.3 dl/g to 4.0 dl/g, and most preferably from 1.5 dl/g to 3.0 dl/g.

Soluble Fraction (SF) of the CRYSTEX Measurement:

The soluble phase of the CRYSTEX measurement is thus preferably present in the heterophasic polypropylene in an amount of from more than 5.0 wt % to 25.0 wt %, more preferably from 7.0 wt % to 23.0 wt % and most preferably from 10.0 wt % to 20.0 wt %, based on the total amount of heterophasic polypropylene.

Preferably, the soluble fraction has an ethylene content of from 8.0 wt % to 70.0 wt %, more preferably from 9.0 wt % to 50.0 wt % and most preferably from 10.0 wt % to 35.0 wt %, based on the total amount of monomer units in the soluble phase.

Thereby, the remaining amount of monomer units of the soluble fraction making up to 100 wt % is the amount of propylene monomer units.

Further, the soluble fraction preferably has an intrinsic viscosity iV of from 1.0 dl/g to 5.0 dl/g, more preferably from 1.2 dl/g to 3.0 dl/g, and most preferably from 1.3 dl/g to 2.5 dl/g.

The heterophasic polypropylene has a melt flow rate $MFR_2$ (ISO 1133; 230° C.; 2.16 kg) in the range of 0.5 to 100.0 g/10 min, preferably in the range of 1.0 to 80.0 g/10 min and more preferably in the range of 1.5 to 60.0 g/10 min. Yet more preferably the melt flow rate $MFR_2$ is in the range of 2.0 to 10.0 g/10 min.

The total ethylene content (determined with FTIR) of the heterophasic polypropylene is preferably in the range of 0.5 to 10.0 wt %, preferably in the range of 0.8 to 8.0 wt % and more preferably in the range of 1.2 to 6.0 wt %.

Preferably, the heterophasic polypropylene has an intrinsic viscosity iV of from 1.2 to 6.0 dl/g, more preferably of from 1.5 to 5.0 dl/g and most preferably of from 1.7 to 4.0 dl/g.

The heterophasic polypropylene preferably has a melting temperature of from 145° C. to 165° C., more preferably of from 148° C. to 160° C. and most preferably of from 150° C. to 158° C.

The heterophasic polypropylene can comprise one or more additives in an amount of from 0.0 up to 5.0 wt %, based on the total amount of the heterophasic polypropylene. The one or more additives are selected from slip agents, anti-block agents, UV stabilizers, acid scavengers, antioxidants, alpha- and/or beta nucleating agents, antistatic agents, etc. Such additives are commonly known to a person skilled in the art.

Usually, these additives are added in quantities of 100 to 2000 ppm for each single component.

The one or more additives can be added to the heterophasic polypropylene in a blending step after polymerization of the matrix phase and the elastomeric phase.

Thereby, the one or more additives can be added to the heterophasic polypropylene in form of master batches in which one or more additives are blended with a carrier polymer in concentrated amounts. Any optional carrier polymer is calculated to the amount of additives, based on the total amount of the heterophasic polypropylene.

Preparation of the Heterophasic Polypropylene (HECO)

The heterophasic propylene copolymer (HECO) in accordance with the present invention may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

The heterophasic propylene copolymer (HECO) according to the invention is preferably prepared by a sequential polymerization process, as described below, in the presence of a catalyst system comprising a Ziegler-Natta Catalyst or a metallocene-based catalysts. Preferably a metallocene-based catalysts is used.

The term "sequential polymerization system" according to this invention indicates that the heterophasic polypropylene (HECO) is produced in at least two polymerization reactors connected in series. Accordingly, the present polymerization system comprises at least a first polymerization reactor (R1), a second polymerization reactor (R2), optionally a third polymerization reactor (R3), and further optionally a fourth polymerization reactor (R4). The term "polymerization reactor" shall indicate that the main polymerization takes place.

Preferably, at least one of the two polymerization reactors (R1) and (R2) is a gas phase reactor (GPR). More preferably the second polymerization reactor (R2), the optional third polymerization reactor (R3) and the optional fourth polymerization reactor (R4) are gas phase reactors (GPRs), i.e. a first gas phase reactor (GPR1) and a second gas phase reactor (GPR2) and a third gas phase reactor (GPR3). A gas phase reactor (GPR) according to this invention is preferably a fluidized bed reactor, a fast fluidized bed reactor or a settled bed reactor or any combination thereof.

Accordingly, the first polymerization reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention, the slurry reactor (SR) is preferably a (bulk) loop reactor (LR).

In this first polymerization reactor (R1) the matrix polypropylene (H-PP) or part of it, i.e. a first propylene homopolymer fraction (H-PP-1), is produced.

Preferably this propylene homopolymer of the first polymerization reactor (R1), more preferably the polymer slurry of the loop reactor (LR) containing the matrix (M) or part of it, i.e. a first propylene homopolymer fraction (H-PP-1), is directly fed into the second polymerization reactor (R2), i.e. into the (first) gas phase reactor (GPR1), without a flash step between the stages.

This kind of direct feed is described in EP 887379 A, EP 887380 A, EP 887381 A and EP 991684 A.

By "direct feed" is meant a process wherein the content of the first polymerization reactor (R1), i.e. of the loop reactor (LR), the polymer slurry comprising the propylene homopolymer matrix (H-PP) or part of it, i.e. a first propylene homopolymer fraction (H-PP-1), is led directly to the next stage gas phase reactor.

Alternatively, the propylene homopolymer of the first polymerization reactor (R1), preferably polymer slurry of the loop reactor (LR) containing the propylene homopolymer matrix, may be also directed into a flash step or through a further concentration step before fed into the second polymerization reactor (R2), i.e. into the 1st gas phase reactor (GPR1). Accordingly, this "indirect feed" refers to a process wherein the content of the first polymerization reactor (R1), of the loop reactor (LR), i.e. the polymer slurry, is fed into the second polymerization reactor (R2), into the (first) gas phase reactor (GPR1), via a reaction medium separation unit and the reaction medium as a gas from the separation unit.

More specifically, the second polymerization reactor (R2) and any subsequent reactor, for instance, the third (R3) or fourth polymerization reactor (R4) are preferably gas phase reactors (GPRs). Such gas phase reactors (GPR) can be any mechanically mixed or fluid bed reactors.

Preferably, the gas phase reactors (GPRs) comprise a mechanically agitated fluid bed reactor with gas velocities of at least 0.2 m/sec. Thus, it is appreciated that the gas phase reactor is a fluidized bed type reactor preferably with a mechanical stirrer.

Thus, in a preferred embodiment the first polymerization reactor (R1) is a slurry reactor (SR), like loop reactor (LR), whereas the second polymerization reactor (R2) and the optional third polymerization reactor (R3), and the optional fourth polymerization reactor (R4) are gas phase reactors (GPRs).

Accordingly for the instant process at least two, preferably two polymerization reactors (R1), and (R2) or three polymerization reactors (R1), (R2) and (R3), or even four polymerization reactors (R1), (R2), R(3) and (R4), namely a slurry reactor (SR), like loop reactor (LR) and a (first) gas phase reactor (GPR1), an optional second gas phase reactor (GPR2), and optionally a third gas phase reactor (GPR3) connected in series are used.

Prior to the slurry reactor (SR) a pre-polymerization reactor is placed.

As the process covers also a pre-polymerization step, all of the catalyst, preferably the metallocene-based catalyst, is fed in the pre-polymerization reactor. Subsequently the pre-polymerization product containing the catalyst, preferably the metallocene-based catalyst, is transferred into the first polymerization reactor (R1).

Especially good results are achieved in case the temperature in the reactors is carefully chosen.

Accordingly it is preferred that the operating temperature in the first polymerization reactor (R1) is in the range of 62 to 85° C., more preferably in the range of 65 to 82° C., still more preferably in the range of 67 to 80° C.

Alternatively or additionally to the previous paragraph it is preferred that the operating temperature in the second polymerization reactor (R2) and in the optional third reactor (R3) and the optional the fourth reactor (R4) is in the range of 75 to 95° C., more preferably in the range of 78 to 92° C.

Preferably, the operating temperature in the second polymerization reactor (R2) is equal to or higher than the operating temperature in the first polymerization reactor (R1). Accordingly it is preferred that the operating temperature (a) in the first polymerization reactor (R1) is in the range of 62 to 85° C., more preferably in the range of 65 to 82° C., still more preferably in the range of 67 to 80° C., like 70 to 80° C.; and (b) in the second polymerization reactor (R2) is in the range of 75 to 95° C., more preferably in the range of 78 to 92° C., still more preferably in the range of 78 to 88° C., with the proviso that the operating temperature in the in the second polymerization reactor (R2) is equal or higher to the operating temperature in the first polymerization reactor (R1).

Typically the pressure in the first polymerization reactor (R1), preferably in the loop reactor (LR), is in the range from 20 to 80 bar, preferably 30 to 70 bar, like 35 to 65 bar, whereas the pressure in the second polymerization reactor (R2), i.e. in the (first) gas phase reactor (GPR1), and in any subsequent reactor, like in the third polymerization reactor (R3), e.g. in the second gas phase reactor (GPR2), or in a fourth polymerization reactor (R4), e.g. in the third gas phase reactor (GPR3) is in the range from 5 to 50 bar, preferably 15 to 40 bar.

Preferably hydrogen is added in each polymerization reactor in order to control the molecular weight, i.e. the melt flow rate $MFR_2$.

Preferably, the average residence time is rather long in the polymerization reactors (R1) and (R2). In general, the average residence time (T) is defined as the ratio of the reaction volume (VR) to the volumetric outflow rate from the reactor (Qo) (i.e. VR/Qo), i.e $\tau$=VR/Qo [tau=VR/Qo]. In case of a loop reactor the reaction volume (VR) equals to the reactor volume.

Accordingly, the average residence time (T) in the first polymerization reactor (R1) is preferably at least 5 min, more preferably in the range of 15 to 80 min, still more preferably in the range of 20 to 60 min, like in the range of 24 to 50 min, and/or the average residence time (T) in the second polymerization reactor (R2) is preferably at least 70 min, more preferably in the range of 70 to 220 min, still more preferably in the range of 80 to 210 min, yet more preferably in the range of 90 to 200 min, like in the range of 90 to 190 min. Preferably, the average residence time ($\tau$) in the third polymerization reactor (R3) or in the fourth polymerization reactor (R4)—if present—is preferably at least 30 min, more preferably in the range of 30 to 120 min, still more preferably in the range of 40 to 100 min, like in the range of 50 to 90 min.

As mentioned above the preparation of the heterophasic polypropylene (HECO) comprises in addition to the (main) polymerization of the propylene polymer in the at least two polymerization reactors (R1, R2 and optional R3, R4) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the catalyst, preferably the metallocene-based catalyst. According to this embodiment the catalyst, preferably the metallocene-based catalyst and the co-catalyst (Co), are all introduced to the pre-polymerization step. However, this shall not exclude the option that at a later stage for instance further co-catalyst (Co) is added in the polymerization process, for instance in the first reactor (R1). In one embodiment the catalyst, preferably the metallocene-based catalyst and the co-catalyst (Co), are only added in the pre-polymerization reactor (PR).

The pre-polymerization reaction is typically conducted at a temperature of 10 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed can be employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, a mixture (MI) of the catalyst, preferably the metallocene-based catalyst, and the polypropylene (Pre-PP) produced in the pre-polymerization reactor (PR) is obtained. Preferably the catalyst, preferably the metallocene-based catalyst, is (finely) dispersed in the polypropylene (Pre-PP).

Accordingly, the heterophasic polypropylene (HECO) is preferably produced in a process comprising polymerizing propylene in at least two subsequent polymerization steps in the presence of a metallocene-based catalyst, whereby:

a) In the first polymerization reactor (R1), i.e. in a loop reactor (LR), propylene is polymerized obtaining either a first propylene homopolymer fraction (H-PP-1) or the propylene homopolymer matrix (M), transferring said first propylene homopolymer fraction (H-PP-1) or propylene homopolymer matrix (M) to a second polymerization reactor (R2), c) in the second polymerization reactor (R2) either a second propylene homopolymer fraction (H-PP-2), forming together with the first propylene homopolymer fraction (H-PP-1) the propylene homopolymer matrix (M) or the elastomeric propylene-ethylene copolymer fraction in the presence of the propylene homopolymer matrix (M) produced in earlier step a) is produced, whereupon c) if in the first and the second polymerization reactor the propylene homopolymer matrix (M) is produced, in a third polymerization reactor (R3) the elastomeric propylene-ethylene copolymer fraction in the presence of the propylene homopolymer matrix (M) produced in earlier steps a) and b) is produced.

In another preferred process also a prepolymerization step is included prior to the reaction in the first polymerization reactor (R1).

In such a pre-polymerization step prior to the reaction in the first polymerization reactor (R1), a mixture (MI) of the metallocene-based catalyst and the polypropylene (Pre-PP) produced in the pre-polymerization reactor (PR) is obtained. Subsequent to the pre-polymerization, the mixture (MI) of the metallocene-based catalyst and the polypropylene (Pre-PP) produced in the pre-polymerization reactor (PR) is transferred to the first reactor (R1). Typically the total amount of the polypropylene (Pre-PP) in the final heterophasic polypropylene (HECO) is rather low and typically not more than 5.0 wt %, more preferably not more than 4.0 wt %, still more preferably in the range of 0.5 to 4.0 wt %, like in the range 1.0 of to 3.0 wt %

A preferred multistage process is a "loop-gas phase"-process, as developed by Borealis (known as BORSTAR® technology) and is described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic polypropylene is obtained by a multistage polymerization process, as described above, in the presence of a catalyst system.

In the process described above a metallocene-based catalyst for the preparation of the heterophasic polypropylene composition is preferably applied.

This metallocene-based catalyst can be any metallocene-based catalyst for propylene polymerization, which preferably is capable of catalysing the polymerization and copolymerization of propylene and comonomers at a pressure of 500 to 10000 kPa, in particular 2500 to 8000 kPa, and at a temperature of 40 to 110° C., in particular of 60 to 110° C.

Preferably, a metallocene-based catalyst system comprising a metallocene complex of formula (I), as described in WO2013007650 is used together with a cocatalyst comprising a compound of a group 13 metal, e.g. Al or boron.

The catalyst can be used in non-supported form or in solid form. The catalyst may be used as a homogeneous catalyst or heterogeneous catalyst.

The catalyst in solid form, preferably in solid particulate form can be either supported on an external carrier material, like silica or alumina, or, in a particularly preferred embodiment, is free from an external carrier, however still being in solid form. For example, the solid catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

This process is also described in WO2013007650.

Component (B) Bimodal Metallocene Linear Low-Density Polyethylene (mLLDPE)

As $2^{nd}$ main component a bimodal metallocene linear low-density polyethylene (mLLDPE) is present in the polypropylene composition.

Said bimodal metallocene linear low-density polyethylene (mLLDPE)

(ii-a) being a terpolymer of ethylene and two different comonomers selected from alpha olefins having from 4 to 10 carbon atoms and (ii-b) being produced with a metallocene catalyst and (ii-c) having a density of 915 to 930 kg/m3 (according to ISO 1183)

Suitable bimodal metallocene linear low-density polyethylene (mLLDPE) are for example known from WO2016083208, EP3257879 and EP3257895.

Such a bimodal metallocene linear low-density polyethylene (mLLDPE) comprises at least (i) an ethylene polymer component (A) having an $MFR_2$ of 1.0 to 10.0 g/10 min (according to ISO 1133 at 190° C. under 2.16 kg load) and (ii) an ethylene polymer component (B) having an $MFR_2$ of 0.2 to 0.9 g/10 min (according to ISO 1133 at 190° C. under 2.16 kg load).

The term "bimodal" in context of bimodal metallocene linear low-density polyethylene (mLLDPE) means herein bimodality with respect to melt flow rate (MFR) of the ethylene polymer components (A) and (B), i.e. the ethylene polymer components (A) and (B) have different MFR values.

In addition to bimodality with respect to, i.e. difference between, the MFR of the ethylene polymer components (A) and (B), the metallocene linear low-density polyethylene (mLLDPE) can also be bimodal e.g. with respect to one or both of the two further properties:

Bimodality with respect to, i.e. difference between, the comonomer type or the comonomer content(s) present in the ethylene polymer components (A) and (B), or both the type and content(s) of comonomers present in the ethylene polymer components (A) and (B); and/or the density of the ethylene polymer components (A) and (B).

The two alpha-olefin comonomers having from 4 to 10 carbon atoms of the metallocene linear low-density polyethylene (mLLDPE) are preferably 1-butene and 1-hexene.

As described in the above mentioned patent applications, the bimodal metallocene linear low-density polyethylene (mLLDPE) is produced using a metallocene catalyst.

The metallocene catalyst, which means the catalytically active metallocene complex is used together with a cocatalyst, which is also known as an activator. Suitable activators are metal alkyl compounds and especially aluminium alkyl compounds known in the art. Especially suitable activators used with metallocene catalysts are alkylaluminium oxycompounds, such as methylalumoxane (MAO), tetraisobutylalumoxane (TIBAO) or hexaisobutylalumoxane (HIBAO).

Preferred bimodal metallocene linear low-density polyethylenes comprise ethylene polymer component (A) with a lower amount (mol %) of comonomer than the ethylene polymer component (B), e.g. the amount of comonomer, preferably of 1-butene in the ethylene polymer component (A) is from 0.05 to 0.9 mol %, more preferably from 0.1 to 0.8 mol %, whereas the amount of comonomer, preferably of 1-hexene in the ethylene polymer component (B) is from 1.0 to 5.0 mol %, more preferably from 1.2 to 3.5 mol %.

The total amount of comonomers present in the bimodal metallocene linear low-density polyethylene is in the range of 1.0 to 6.0 mol %, preferably in the range of 1.2 to 5.5 mol % and more preferably in the range of 1.3 to 5.0 mol %.

The molecular weight distribution (MWD, Mw/Mn) of the bimodal metallocene linear low-density polyethylene is in a range of 2.0 to 5.0, preferably in a range of 2.2 to 4.8 and more preferably in a range of 2.4 to 4.6.

Preferably, the bimodal metallocene linear low-density polyethylene comprises the ethylene polymer component (A) in an amount of 30 to 70 wt %, more preferably of 35 to 60 wt %, and still more preferably of 40 to 45 wt %, and the ethylene polymer component (B) in an amount of 70 to 30, more preferably of 65 to 40, and still more preferably of 60 to 55 wt %.

Most preferably, the bimodal metallocene linear low-density polyethylene consists of the ethylene polymer components (A) and (B) as the sole polymer components.

Further Optional Components

The polypropylene composition according to the present invention can further comprise (C) a polypropylene homopolymer and/or (D) an alpha nucleating agent Component (C)

As optional Component (C) a polypropylene homopolymer can be added in an amount of 0.0 to 6.0 wt %, preferably 1.0 to 5.0 wt % and more preferably in an amount of 1.5 to 3.0 wt %, based on the total weight of the composition.

Suitable polypropylene homopolymers have a melt flow rate MFR2 (ISO 1133; 230° C.; 2.16 kg) in the range of 0.5 to 100.0 g/10 min, preferably in the range of 1.0 to 40.0 g/10 min and more preferably in the range of 1.5 to 10.0 g/10 min.

Such polypropylene homopolymers are either commercially available, like for example HB306MO, HD905 or HF955MO of Borealis, or may be prepared by any suitable process, including in particular blending processes such as mechanical blending including mixing and melt blending processes and any combinations thereof as well as in-situ blending during the polymerization process. These can be carried out by methods known to the skilled person, including batch processes and continuous processes.

Preferred polypropylene homopolymers are prepared by a sequential polymerization process, as described above for the HECO, in the presence of a catalyst system comprising a Ziegler-Natta Catalyst or a metallocene-based catalysts. Preferably a Ziegler-Natta catalysts is used.

Component (D)

As optional Component (D) an alpha nucleating agent can be added in an amount of 0.0 to 1.0 wt %, preferably 0.05 to 0.8 wt % and more preferably in an amount of 0.1 to 0.5 wt %, based on the total weight of the composition.

Examples of suitable alpha nucleating agents can be selected from the group consisting of:

(i) salts of monocarboxylic acids and polycarboxylic acids, e.g. sodium benzoate or aluminum tert-butylbenzoate; calcium salt of hexahydrophthalic acid;

(ii) soluble nucleating agents, like sorbitol derivatives, e.g. di(alkylbenzylidene)sorbitols as 1,3:2,4-25 dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol, and benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide, wherein 1,3:2,4-di(4-methylbenzylidene) sorbitol and N-[3,5-bis-(2,2-dimethyl-propionylamino)-phenyl]-2,2-dimethyl-propionamide are equally preferred, (iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium is preferred; and (iv) polymeric nucleating agents, such as polymerized vinyl compounds, in particular vinyl cycloalkanes, like vinyl cyclohexane (VCH), poly(vinyl cyclohexane) (PVCH), vinylcyclopentane, and vinyl-2-methyl cyclohexane, 3-methyl-1-butene, 3-ethyl-1-hexene, 3-methyl-1-pentene, 4-methyl-1-pentene or mixtures thereof. PVCH is a particularly preferred.

The polypropylene composition of the present invention comprises the above defined blend of component (A) and component (B) and optional Components (C) and/or (D). In addition the composition may optionally contain one or more further additives in a total amount of from 0.0 up to 5.0 wt %, based on the composition, selected from the group comprising slip agents, anti-block agents, UV stabilizers, acid scavengers, anti-oxidants, antistatic agents, etc.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamides (CAS No. 112-84-5), oleamides (CAS No. 301-02-0) or stearamide (CAS No. 124-26-5).

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS-no. 11097-59-9), lactates and lactylates, as well as calcium stearate (CAS 1592-23-0) and zinc stearate (CAS 557-05-1);

Common antiblocking agents are natural silica such as diatomaceous earth (such as CAS-no. 60676-86-0 (SuperfFloss™), CAS-no. 60676-86-0 (SuperFloss E™), or CAS-no. 60676-86-0 (Celite 499™)), synthetic silica (such as CAS-no. 7631-86-9, CAS-no. 7631-86-9, CAS no. 7631-86-9, CAS-no. 7631-86-9, CAS-no. 7631-86-9, CAS-no. 7631-86-9, CAS-no. 112926-00-8, CAS-no. 7631-86-9, or CAS-no. 7631-86-9), silicates (such as aluminium silicate (Kaolin) CAS-no. 1318-74-7, sodium aluminum silicate CAS-no. 1344-00-9, calcined kaolin CAS-no. 92704-41-1, aluminum silicate CAS-no. 1327-36-2, or calcium silicate CAS-no. 1344-95-2), synthetic zeolites (such as sodium calcium aluminosilicate hydrate CAS-no. 1344-01-0, CAS-no. 1344-01-0, or sodium calcium aluminosilicate, hydrate CAS-no. 1344-01-0)

Suitable UV-stabilisers are, for example, Bis-(2,2,6,6-tetramethyl-4-piperidyl)-sebacate (CAS 52829-07-9, Tinuvin 770); 2-hydroxy-4-n-octoxy-benzophenone (CAS 1843-05-6, Chimassorb 81)

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-2.000 ppm for each single component.

The optional further additives are either added during blending component (A) and component (B) or are already added to component (a) and/or (b) during their production, i.e. during pelletization.

The Polypropylene Composition

The inventive polypropylene composition is especially featured by its specific optical and mechanical properties.

The inventive polypropylene composition has a Charpy notched Impact strength (NIS, ISO 179 1eA determined at 23° C.) of at least 15.0 kJ/m$^2$, preferably in the range of from 15.0 to 50.0 kJ/m$^2$, more preferably in the range of from 20.0 to 45.0 kJ/m$^2$, even more preferably in the range of from 25.0 to 40.0 kJ/m$^2$. The Charpy notched impact strength is measured according to ISO 179/1eA at 23° C. on injection moulded test specimens as described in EN ISO 1873-2.

The Charpy notched Impact strength (NIS, ISO 179 1eA determined at −20° C.) is at least 1.0 kJ/m$^2$, up to 3.0 kJ/m$^2$, preferably up to 2.0 kJ/m$^2$.

The polypropylene composition according to the invention preferably has a haze value below 35.0%, preferably of from 15.0% to 32.0%, more preferably of from 20.0% to 30.0%. The haze value is measured according to ASTM D1003 on injection moulded plaques having 1 mm thickness produced as described in EN ISO 1873-2.

In addition, it is preferred that the polypropylene composition has a flexural modulus measured according to ISO 178 of at least 600 MPa, more preferably of at least 800 MPa and even more preferred of at least 900 MPa.

The upper limit for the flexural modulus of the polypropylene composition can be up to 2000 MPa, preferably up to 1600 MPa and more preferably up to 1200 MPa.

In one embodiment of the present invention, the polypropylene composition has an optomechancial ability (OMA) of at least 500 or more. The upper limit is preferably 2000. Preferably the optomechancial ability (OMA) is at least 600 up to 1800, more preferably at least 800 up to 1500.

The optomechancial ability (OMA) is determined according to below formula:

$$OMA = \frac{\text{Flex Modulus [MPa]} * NIS\left[\frac{kJ}{m^2}\right]}{\text{Haze (1 mm) [\%]}}$$

The polypropylene composition according to this invention is featured by a rather moderate melt flow rate. Accordingly, the polypropylene composition has a melt flow rate MFR$_2$ (230° C./2.16 kg) measured according to ISO 1133 in the range of 0.5 to 100.0 g/10 min, preferably in the range of 1.0 to 50.0 g/10 min, more preferably in the range of 2.0 to 30.0 g/10 min and still more preferably in the range of 3.0 to 10.0 g/10 min.

Preferably, it is desired that the polypropylene composition is thermo-mechanically stable. Accordingly, it is appreciated that the polypropylene composition has a melting temperature of at least 140° C., more preferably in the range of 140 to 165° C., still more preferably in the range of 145 to 160° C.

The melting temperature (Tm) is measured by DSC according to ISO 11357/3.

Generally, the polypropylene composition according to the invention has a crystallization temperature >120° C., preferably in the range of from 121 to 132° C., more preferably in the range of 122 to 130° C. The crystallization temperature (Tc) is measured by DSC according to ISO 11357/3.

The polypropylene composition of the present invention comprises
Component (A) in an amount of from 95.0 to 55.0 wt %
Component (B) in an amount of from 5.0 to 45.0 wt %
Component (C) in an amount of from 0.0 to 6.0 wt % and
Component (D) in an amount from 0.0 to 1.0 wt %, based on the total weight of the composition.

Preferably, the polypropylene composition of the present invention comprises
Component (A) in an amount of from 90.0 to 75.0 wt %
Component (B) in an amount of from 10.0 to 25.0 wt %
Component (C) in an amount of from 1.0 to 5.0 wt % and
Component (D) in an amount from 0.05 to 0.8 wt %, based on the total weight of the composition.

As is common knowledge and stated above the composition may optionally contain one or more further additives in a total amount of from 0.0 up to 5.0 wt %, based on the composition, selected from the group comprising slip agents, anti-block agents, UV stabilizers, acid scavengers, anti-oxidants, antistatic agents, etc., whereby the total sum of (A), (B), (C), (D) and optional further additives is 100.0 wt %

Article

The polypropylene composition of this invention can be further converted to an end product, i.e. an article, by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably, articles are packaging containers made by injection moulding, blow moulding or thermoforming, or packaging films made by film extrusion.

The polypropylene composition of the present invention is therefore suitable for the preparation of a variety of articles, like films (cast and blown film) for flexible packaging systems, such as bags or pouches for food and pharmaceutical packaging or medical articles in general as well as moulded articles.

In an embodiment, the present invention is related to an article, the article being an unoriented mono-layer film comprising the inventive polypropylene composition. Accordingly the present invention is also directed to an article, the article being an unoriented mono-layer film, like cast film or blown film, e.g. air cooled blown film, comprising at least 90 wt %, preferably comprising at least 95 wt %, yet more preferably comprising at least 99 wt %, of the instant polypropylene composition.

The above described composition is suitable for the production of blown films as well as cast films.

Mono-layer films having a thickness of 5 to 300 μm, preferably 10 to 200 μm, more preferably 20 to 150 μm are suitable according to the present invention.

In another embodiment, the present invention is related to an article, the article being a moulded article comprising the inventive polypropylene composition.

Moulded articles can be produced by injection moulding, stretch moulding, or injection stretch blow moulding. Moulded articles produced by injection moulding are especially preferred.

The moulded articles preferably are thin-walled articles having a wall thickness of 300 micrometer to 2 mm. More preferably, the thin-walled articles have a wall thickness of 300 micrometer to 1400 micrometer, and even more preferably, the thin-walled articles have a wall thickness of 300 micrometer to 900 micrometer.

The moulded articles of the current invention can be containers, such as cups, buckets, beakers, trays or parts of such articles, such as see-through-windows, lids, or the like.

Articles of the current invention are also suitable for medical or diagnostic purposes, such as syringes, beakers, titre plates, pipettes, etc.

Use as Modifier

As already stated above, the invention is also related to the use of the bimodal metallocene linear low-density polyethylene (mLLDPE) as defined above as modifier for heterophasic polypropylenes (HECOs) as defined above to improve impact strength and optics of the HECO.

By adding the mLLDPE to the HECO, composition with a Charpy notched Impact strength (NIS, ISO 179 1eA determined at 23° C.) of at least 15.0 kJ/m$^2$, preferably in the range of from 15.0 to 50.0 kJ/m2, more preferably in the range of from 20.0 to 45.0 kJ/m2, even more preferably in the range of from 25.0 to 40.0 kJ/m2 are obtained The Charpy notched impact strength is measured according to ISO 179/1eA at 23° C. on injection moulded test specimens as described in EN ISO 1873-2.

In addition the use of the mLLDPE as modifier yields compositions having a haze value below 35.0%, preferably of from 15.0% to 32.0%, more preferably of from 20.0% to 30.0%. The haze value is measured according to ASTM D1003 on injection moulded plaques having 1 mm thickness produced as described in EN ISO 1873-2.

Experimental Part

Measuring Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer.

The melt flow rate MFR$_2$ of the heterophasic polypropylene (HECO) is measured at 230° C. with a load of 2.16 kg (MFR230/2.16) according to ISO 1133.

The melt flow rate MFR$_2$ of the bimodal metallocene linear low-density polyethylene (mLLDPE) is measured at 190° C. with a load of 2.16 kg (MFR190/2.16) according to ISO 1133.

The melt flow rate MFR$_2$ of the polypropylene composition is measured at 230° C. with a load of 2.16 kg (MFR230/2.16) according to ISO 1133.

Density

Density is measured according to ISO 1183. Sample preparation is done by compression moulding in accordance with ISO 1873.

DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30° C. to +225° C.

Crystallization temperature and heat of crystallization (Hc) are determined from the cooling step, while melting temperature and heat of fusion (Hf) are determined from the second heating step.

Comonomer Content C2 in HECO

Poly(propylene-co-ethylene)-ethylene content by IR spectroscopy Quantitative infrared (IR) spectroscopy was used to quantify the ethylene content of the poly(ethylene-co-propene) copolymers through calibration to a primary method.

Calibration was facilitated through the use of a set of in-house non-commercial calibration standards of known ethylene contents determined by quantitative 13C solution-state nuclear magnetic resonance (NMR) spectroscopy. The calibration procedure was undertaken in the conventional manner well documented in the literature. The calibration set consisted of 38 calibration standards with ethylene contents ranging 0.2-75.0 wt % produced at either pilot or full scale under a variety of conditions. The calibration set was selected to reflect the typical variety of copolymers encountered by the final quantitative IR spectroscopy method.

Quantitative IR spectra were recorded in the solid-state using a Bruker Vertex 70 FTIR spectrometer. Spectra were recorded on 25×25 mm square films of 300 um thickness prepared by compression moulding at 180-210° C. and 4-6 mPa. For samples with very high ethylene contents (>50 mol %) 100 um thick films were used. Standard transmission FTIR spectroscopy was employed using a spectral range of 5000-500 cm-1, an aperture of 6 mm, a spectral resolution of 2 cm-1, 16 background scans, 16 spectrum scans, an interferogram zero filling factor of 64 and Blackmann-Harris 3-term apodisation.

Quantitative analysis was undertaken using the total area of the CH2 rocking deformations at 730 and 720 cm-1 (AQ) corresponding to (CH2)>2 structural units (integration method G, limits 762 and 694 cm-1). The quantitative band was normalised to the area of the CH band at 4323 cm-1 (AR) corresponding to CH structural units (integration method G, limits 4650, 4007 cm-1). The ethylene content in units of weight percent was then predicted from the normalised absorption (AQ/AR) using a quadratic calibration curve. The calibration curve having previously been constructed by ordinary least squares (OLS) regression of the normalised absorptions and primary comonomer contents measured on the calibration set.

Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

A schematic representation of the CRYSTEX QC instrument is shown in FIG. 1a. The crystalline and amorphous fractions are separated through temperature cycles of dissolution at 160° C., crystallization at 40° C. and re-dissolution in 1,2,4-trichlorobenzene (1,2,4-TCB) at 160° C. as shown in FIG. 1b. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt % to 69 wt % (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt %.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1a and b, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are measured (Wt % SF, Wt % C2, IV).

EP means ethylene propylene copolymer.

PP means polypropylene.

FIG. 1a shows a schematic diagram of the CRYSTEX QC instrument.

FIG. 1b shows an elution diagram of an exemplary ethylene-propylene copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene, The Column Advanstar Publications, February 2014. Pages 18-23).

Comonomer Content C2+C4+C6 in mLLDPE

Quantification of Microstructure by NMR Spectroscopy

Quantitative nuclear-magnetic resonance (NMR) spectroscopy was used to quantify the comonomer content of the polymers.

Quantitative $^{13}C\{^{1}H\}$ NMR spectra recorded in the molten-state using a Bruker Advance III 500 NMR spectrometer operating at 500.13 and 125.76 MHz for $^{1}H$ and $^{13}C$ respectively. All spectra were recorded using a $^{13}C$ optimised 7 mm magic-angle spinning (MAS) probehead at 150° C. using nitrogen gas for all pneumatics.

Approximately 200 mg of material was packed into a 7 mm outer diameter zirconia MAS rotor and spun at 4 kHz. This setup was chosen primarily for the high sensitivity needed for rapid identification and accurate quantification.{klimke06, parkinson07, castignolles09} Standard single-pulse excitation was employed utilising the NOE at short recycle delays{pollard04, klimke06} and the RS-HEPT decoupling scheme{fillip05,griffin7}. A total of 1024 (1k) transients were acquired per spectra.

Quantitative $^{13}C\{^{1}H\}$ NMR spectra were processed, integrated and relevant quantitative properties determined from the integrals. All chemical shifts are internally referenced to the bulk methylene signal (δ+) at 30.00 ppm.

The amount of ethylene was quantified using the integral of the methylene (δ+) sites at 30.00 ppm accounting for the number of reporting sites per monomer:

$$E = I_{\delta+}/2$$

the presence of isolated comonomer units is corrected for based on the number of isolated comonomer units present:

$$Etotal = E + (3*B + 2*H)/2$$

where B and H are defined for their respective comonomers. Correction for consecutive and non-consecutive commoner incorporation, when present, is undertaken in a similar way.

Characteristic signals corresponding to the incorporation of 1-butene were observed and the comonomer fraction calculated as the fraction of 1-butene in the polymer with respect to all monomer in the polymer:

$$fBtotal = (Btotal/(Etotal+Btotal+Htotal)$$

The amount isolated 1-butene incorporated in EEBEE sequences was quantified using the integral of the *B2 sites at 38.3 ppm accounting for the number of reporting sites per comonomer:

$$B = I_{*B2}$$

The amount consecutively incorporated 1-butene in EEBBEE sequences was quantified using the integral of the αα B2B2 site at 39.4 ppm accounting for the number of reporting sites per comonomer:

$$BB = 2*I_{\alpha\alpha B2B2}$$

The amount non consecutively incorporated 1-butene in EEBEBEE sequences was quantified using the integral of the ββB2B2 site at 24.7 ppm accounting for the number of reporting sites per comonomer:

$$BEB = 2*I_{\beta\beta B2B2}$$

Due to the overlap of the *B2 and *βB2B2 sites of isolated (EEBEE) and non-consecutively incorporated (EEBEBEE) 1-butene respectively the total amount of isolated 1-butene incorporation is corrected based on the amount of non-consecutive 1-butene present:

$$B = *I_{*B2} - 2*I_{\beta\beta B2B2}$$

The total 1-butene content was calculated based on the sum of isolated, consecutive and non-consecutively incorporated 1-butene:

$$Btotal = B + BB + BEB$$

The total mole fraction of 1-butene in the polymer was then calculated as:

$$fB = (Btotal/(Etotal+Btotal+Htotal)$$

The amount consecutively incorporated 1-hexene in EEHHEE sequences was quantified using the integral of the αα B4B4 site at 40.5 ppm accounting for the number of reporting sites per comonomer:

$$HH = 2*I_{\alpha\alpha B4B4}$$

The amount non consecutively incorporated 1-hexene in EEHEHEE sequences was quantified using the integral of the ββB4B4 site at 24.7 ppm accounting for the number of reporting sites per comonomer:

$$HEH = 2*I_{\beta\beta B4B4}$$

The total mole fraction of 1-hexene in the polymer was then calculated as:

$$fH = (Htotal/(Etotal+Btotal+Htotal)$$

The mole percent comonomer incorporation is calculated from the mole fraction:

$$B[mol\%] = 100*fB$$

$$H[mol\%] = 100*fH$$

The weight percent comonomer incorporation is calculated from the mole fraction:

$$B[wt\%] = 100*(fB*56.11)/((fB*56.11)+(fH*84.16)+((1-(fB+fH))*28.05))$$

$$H[wt\%] = 100*(fH*84.16)/((fB*56.11)+(fH*84.16)+((1-(fB+fH))*28.05))$$

REFERENCES

Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253

Xylene Cold Solubles (XCS) Content
is measured at 25° C. according to ISO 16152, first edition; 2005.
Intrinsic Viscosity (iV)
is measured according to DIN ISO 1628/1, October 1999 in decalin at 135° C.
Flexural Modulus
The flexural modulus was determined in 3-point-bending at 23° C. according to ISO 178 on 80×10×4 mm³ test bars injection moulded in line with EN ISO 1873-2.
Notched Impact Strength (NIS):
The Charpy notched impact strength (NIS) was measured according to ISO 179 1eA at +23° C. or at −20° C. as indicated, using injection moulded bar test specimens of 80×10×4 mm prepared in accordance with EN ISO 1873-2.

Haze

Haze is determined according to ASTM D1003-00 on 60×60×1 mm³ plaques injection moulded in line with EN ISO 1873-2 and indicated as Haze₁

Optomechnical Ability (OMA)

Optomechnical ability (OMA) is understood as the ratio of mechanical (especially impact and flexural modulus) behaviour, to optical performance, namely haze, wherein the mechanical properties are targeted to be as high as possible and the optical performance is desired to be as low as possible.

The optomechanical ability is determined according the formula given below

Formula:

$$OMA = \frac{\text{Flex Modulus [MPa]} * NIS\left[\frac{kJ}{m^2}\right]}{\text{Haze (1 mm) [\%]}}$$

Unit: [(kJ*MPA)/(m²*%)]

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy ($H_m$) are determined from the second heating step.

Throughout the patent the term Tc or (Tcr) is understood as Peak temperature of crystallization as determined by DSC at a cooling rate of 10 K/min.

Examples

Component (A): Heterophasic Polypropylene (HECO)

Catalyst for HECO:

The catalyst for the heterophasic polypropylene component HECO was rac-anti-Me2Si(2-Me-4-(p-tBuPh)-Ind)(2-Me-4-Ph-5-OMe-6-tBu-Ind)ZrCl2 prepared as described in WO2013007650.

Preparation of the Solid Catalyst System for HECO:

Inside the glovebox, 80 μL of a dry and degassed mixture of perfluoroalkylethyl acrylate ester were mixed in a septum vial with 2 mL of a 30 wt-% solution of MAO in toluene and left to react overnight. The following day, 58.9 mg of the metallocene of the invention rac-anti-Me2Si(2-Me-4-Ph-6-tBu-Ind)(2-Me-4-Ph-5-OMe-6-tBu-Ind)ZrCl2 (0.076 mmol, 1 equivalent) were dissolved with 4 mL of the MAO solution in another septum bottle and left to stir inside the glovebox. After 60 minutes, the 4 mL of the MAO-metallocene solution and 1 mL of the perfluoroalkylethyl acrylate ester mixture in MAO solution were successively added into a 50 mL emulsification glass reactor containing 40 mL of hexadecafluoro-1,3-dimethylcyclohexane kept at −10° C. and equipped with an overhead stirrer (stirring speed=600 rpm). Total amount of MAO is 5 mL (300 equivalents). A red emulsion formed immediately (measured emulsion stability=16 seconds) and was stirred during 15 minutes at 0° C./600 rpm. Then the emulsion was transferred via a 2/4 teflon tube to 100 mL of hot hexadecafluoro-1,3-dimethylcyclohexane heated to 90° C., and stirred at 600 rpm until the transfer is completed. The speed was reduced to 300 rpm. After 15 minutes stirring, the oil bath was removed and the stirrer turned off. The catalyst was left to settle up on top of the hexadecafluoro-1,3-dimethylcyclohexane and after 35 minutes the solvent was siphoned off. The remaining red catalyst was dried during 2 hours at 50° C. over an argon flow. 0.62 g of a red free flowing powder was obtained.

The polymerization of HECO was performed in a Borstar PP pilot plant unit with liquid phase prepolymerization unit, bulk loop reactor and two gas phase reactors in series. Table 1 summarizes the polymerization data.

Component (B): Bimodal Metallocene Linear Low-Density Polyethylene (mLLDPE)

Catalyst for mLLDPE:

The catalyst used for preparing the mLLDPE was a metallocene catalyst with metallocene complex bis(1-methyl-3-n-butyl cyclopentadienyl)Zr(IV)C2 (CAS no. 151840-68-5) supported on Albemarle ActivCat® carrier.

Polymerization was performed as described in EP3257879 for inventive Example IE1 in a Borstar® plant comprising a prepolymerization loop reactor, a loop reactor and a gas phase reactor, whereby the slurry from the prepolymerization reactor was withdrawn intermittently and directed into the loop reactor, subsequently the slurry was withdrawn from the loop reactor intermittently by using settling legs and directed to a flash vessel operated at a temperature of 50° C. and a pressure of 3 bar and from there the polymer was directed to the gas phase reactor (GPR).

The polymer properties are shown in Table 2.

Component (C):

HB306MO is a polypropylene homopolymer, commercially available from Borealis AG, Austria, having an MFR₂ of 1.9 g/10 min.

Component (D):

The commercial product Hyperform HPN20E (calcium salt of hexahydrophthalic acid, CAS No. 491589-22-1), distributed by Milliken, USA, was used.

Comparative Example

For the Comparative Example FB2310 was used as blend partner for the HECO instead of the mLLDPE.

Borstar® FB2310 is a high molecular weight bimodal linear low-density polyethylene prepared with a Ziegler-Natta catalyst available from Borealis AG, Austria, having an MFR₂ of 0.20 g/10 min and a density of 931 kg/m³.

The inventive and comparative examples were compounded in a co-rotating twin-screw extruder Coperion ZSK 57 at 200-240° C. with further 0.15 wt % of Irganox B215 (antioxidant AO) (BASF AG, Germany) and 0.05 wt % calcium stearate (acid scavenger AS) (FACI).

TABLE 1

Polymerization data of the component HECO

| | Unit | HECO |
|---|---|---|
| Prepolymerzation | | |
| Temperature | [° C.] | 20 |
| Residence time | [min] | 20 |
| Loop | | |
| Temperature | [° C.] | 70 |
| pressure | Bar | 55 |

TABLE 1-continued

Polymerization data of the component HECO

|  | Unit | HECO |
|---|---|---|
| split | [wt %] | 53 |
| MFR 2.16 | [g/10 min] | 14 |
| XCS | [wt %] | 1.2 |
| H2/C3 | [mol/kmol] | 0.21 |
| C2/C3 | [mol/kmol] | — |
| GPR1 |  |  |
|  |  |  |
| Temperature | [° C.] | 80 |
| pressure | Bar | 21 |
| Split | [wt %] | 36 |
| MFR 2.16 | [g/10 min] | 4 |
| XCS after GPR1 | [wt %] | 0.8 |
| H2/C3 | [mol/kmol] | 0.36 |
| C2/C3 | [mol/kmol] | — |
| GPR2 |  |  |
|  |  |  |
| Temperature | [° C.] | 70 |
| pressure | Bar | 20 |
| split | [wt %] | 11 |
| MFR 2.16 | [g/10 min] | 4.0 |
| H2/C2 | [mol/kmol] | 0.11 |
| C2/C3 | [mol/kmol] | 399 |
| Pellets |  |  |
|  |  |  |
| MFR 2.16 | [g/10 min] | 4.4 |
| C2total | [wt %] | 3.7 |
| IVtotal | dL/g | 2.1 |
| Tm | [° C.] | 154 |
| Soluble fraction (SF) | [wt %] | 9.6 |
| C2(SF) | [wt %] | 15.4 |
| C2(CF) | [wt %] | 2.5 |
| iV(SF) | dL/g | 1.5 |
| iV(CF) | dL/g | 2.1 |

TABLE 2

Properties of the mLLDPE:

|  | IE1 |
|---|---|
| $MFR_2$ [g/10 min] | 1.5 |
| Density [kg/m³] | 918 |
| Comonomer content $C_4$ [mol %] | 0.3 |
| Comonomer content $C_6$ [mol %] | 2.6 |
| MWD (Mw/Mn) | 3.7 |

TABLE 3

Compositions of the Inventive and Comparative Examples:

|  |  | IE1 | CE1 | CE2 |
|---|---|---|---|---|
| HECO | [wt %] | 80.6 | 97.6 | 80.6 |
| mLLDPE | [wt %] | 17.0 | — | — |
| FB2310 | [wt %] | — | — | 17.0 |
| Component (C) | [wt %] | 2.0 | 2.0 | 2.0 |
| Component (D) | [wt %] | 0.2 | 0.2 | 0.2 |
| AS | [wt %] | 0.05 | 0.05 | 0.05 |
| AO | [wt %] | 0.15 | 0.15 | 0.15 |

TABLE 4

Properties of the Inventive and comparative examples

|  | Unit | IE1 | CE1 | CE2 |
|---|---|---|---|---|
| MFR 230/2.16 | [g/10 min] | 4 | 4.4 | 3.4 |
| Tc | [° C.] | 122 | 123 | 122 |
| Tm | [° C.] | 155 | 155 | 154 |

TABLE 4-continued

Properties of the Inventive and comparative examples

|  | Unit | IE1 | CE1 | CE2 |
|---|---|---|---|---|
| NIS @23° C. | [kJ/m²] | 30.0 | 9.0 | 9.3 |
| NIS @−20° C. | [kJ/m²] | 1.60 | 1.00 | 1.96 |
| flexural modulus | [MPa] | 914 | 1070 | 952 |
| Haze₁ | [%] | 28 | 20 | 85 |
| OMA | [(kJ * MPa)/(m² * %)] | 979 | 483 | 104 |

As can be easily seen, the inventive composition has a much better overall performance than the comparative examples.

Blending with an mLLDPE can boost both of low and room temperature impact, without loosing too much stiffness and optics.

The invention claimed is:

1. A polypropylene composition, comprising
   (A) a heterophasic polypropylene (HECO), said heterophasic polypropylene comprising a matrix (M) being a propylene homopolymer and an elastomeric propylene-ethylene copolymer dispersed in said matrix (M), and
   (B) a bimodal metallocene linear low-density polyethylene (mLLDPE), said bimodal metallocene linear low-density polyethylene (mLLDPE)
      (a) being a terpolymer of ethylene and two different comonomers selected from alpha olefins having from 4 to 10 carbon atoms and
      (b) being produced with a metallocene catalyst and
      (c) having a density of 915 to 930 kg/m³ (according to ISO 1183), and
   (C) optionally a polypropylene homopolymer with a melt flow rate MFR2 (ISO 1133; 230° C.; 2.16 kg) in the range of 0.5 to 100.0 g/10 min and/or
   (D) optionally an alpha nucleating agent.

2. The polypropylene composition according to claim 1 comprising
   component (A) in an amount of from 95.0 to 55.0 wt %,
   component (B) in an amount of from 5.0 to 45.0 wt %,
   component (C) in an amount of from 0.0 to 6.0 wt % and
   component (D) in an amount from 0.0 to 1.0 wt %, based on the total weight of the composition.

3. The polypropylene composition according to claim 1, which has:
   a haze according to ASTM D 1300-00 determined on 1 mm plaques below 35.0% and
   a Charpy notched Impact strength (NIS, ISO 179 1eA determined at 23° C.) of at least 15.0 kJ/m².

4. The polypropylene composition according to claim 1, which has an optomechanical ability (OMA) according to formula $$OMA = \frac{\text{Flex Modulus [MPa]} * NIS\left[\frac{kJ}{m^2}\right]}{\text{Haze (1 mm) [\%]}}$$

of at least 500 or more;
wherein NIS refers to the Charpy notched impact strength measured according to ISO 179 1eA at +23° C.

5. The polypropylene composition according to claim 1, wherein the heterophasic polypropylene (HECO) has a xylene cold soluble (XCS) fraction in the range of from 5.0 to 25.0 wt %, as determined at 25° C., wherein said xylene cold soluble (XCS) fraction has an ethylene content in the range of from 8.0 to 70.0 wt % and an intrinsic viscosity (iV)

from 1.0 to 5.0 dl/g and a crystalline fraction in the range of from 75.0 to 95.0 wt %, wherein said crystalline fraction has an ethylene content in the range of from 0.0 to 5.0 wt % and an intrinsic viscosity (iV) from 1.0 to 5.0 dl/g, as determined according to CRYSTEX QC method, ISO 6427-B.

6. The polypropylene composition according to claim 1, wherein the heterophasic polypropylene (HECO) is prepared by a sequential polymerization process in the presence of a metallocene-based catalyst.

7. The polypropylene composition according to claim 1, wherein the bimodal metallocene linear low-density polyethylene (mLLDPE) comprises at least
(i) an ethylene polymer component (A) having an MFR2 of 1.0 to 10.0 g/10 min (according to ISO 1133 at 190° C. under 2.16 kg load) and
(ii) an ethylene polymer component (B) having an MFR2 of 0.2 to 0.9 g/10 min (according to ISO 1133 at 190° C. under 2.16 kg load).

8. The polypropylene composition according to claim 1, wherein the bimodal metallocene linear low-density polyethylene (mLLDPE) (B) comprises an ethylene polymer component (A') and an ethylene polymer component (B'), wherein the ethylene polymer component (A') has a lower amount (mol %) of comonomer than the ethylene polymer component (B').

9. The polypropylene composition according to claim 8, wherein the amount of comonomer in the ethylene polymer component (A') is from 0.05 to 0.9 mol %, and the amount of comonomer in the ethylene polymer component (B') is from 1.0 to 5.0 mol %.

10. The polypropylene composition according to claim 1, wherein the bimodal metallocene linear low-density polyethylene (mLLDPE) has a total amount of comonomers present in the bimodal metallocene linear low-density polyethylene in the range of 1.0 to 6.0 mol %.

11. An article comprising the polypropylene composition according to claim 1.

12. The article according to claim 11, wherein the article is an unoriented mono-layer film, comprising at least 90 wt % of the polypropylene composition.

13. The article according to claim 11, wherein the article is a moulded article.

* * * * *